US010245956B2

(12) United States Patent
Minesawa

(10) Patent No.: US 10,245,956 B2
(45) Date of Patent: Apr. 2, 2019

(54) PREVENTING HIGH INDUCED VOLTAGE FROM BEING APPLIED TO DISCHARGE CONTROL DEVICE

(71) Applicant: Keihin Corporation, Tokyo (JP)

(72) Inventor: Ryutaro Minesawa, Shioya-gun (JP)

(73) Assignee: KEIHIN CORPORATION, Tokyo (JP)

( * ) Notice: Subject to any disclaimer, the term of this patent is extended or adjusted under 35 U.S.C. 154(b) by 111 days.

(21) Appl. No.: 14/800,994

(22) Filed: Jul. 16, 2015

(65) Prior Publication Data

US 2016/0064956 A1 Mar. 3, 2016

(30) Foreign Application Priority Data

Aug. 28, 2014 (JP) .................. 2014-174293

(51) Int. Cl.
*B60L 3/04* (2006.01)
*B60L 3/00* (2019.01)
*H02J 7/34* (2006.01)

(52) U.S. Cl.
CPC .............. *B60L 3/04* (2013.01); *B60L 3/0007* (2013.01); *B60L 2240/427* (2013.01); *B60L 2240/527* (2013.01); *H02J 7/345* (2013.01); *Y02T 10/642* (2013.01)

(58) Field of Classification Search
CPC .. B60L 3/04; B60L 3/02; B60L 3/0046; B60L 3/0007; B60L 2240/427; B60L 2240/527; Y02T 10/642
USPC .................. 320/166; 307/9.1, 10.1
See application file for complete search history.

(56) References Cited

U.S. PATENT DOCUMENTS

| 5,619,107 | A | * | 4/1997 | Shinohara | ................. B60L 3/00 307/10.7 |
| 2010/0214055 | A1 | * | 8/2010 | Fuji | .......................... B60L 3/00 340/3.1 |
| 2010/0309694 | A1 | * | 12/2010 | Huang | .................. H02M 1/126 363/49 |
| 2012/0062029 | A1 | | 3/2012 | Fukuyama et al. | |
| 2012/0309588 | A1 | * | 12/2012 | Ashida | ....................... B60L 3/04 477/7 |
| 2013/0049663 | A1 | | 2/2013 | Amano et al. | |
| 2013/0234510 | A1 | | 9/2013 | Nakamura | |

(Continued)

FOREIGN PATENT DOCUMENTS

| JP | 8-33103 A | 2/1996 |
| JP | 2013-187941 A | 9/2013 |

(Continued)

OTHER PUBLICATIONS

Related co-pending U.S. Appl. No. 14/795,989.

(Continued)

*Primary Examiner* — Richard Isla
*Assistant Examiner* — Manuel Hernandez
(74) *Attorney, Agent, or Firm* — Westerman, Hattori, Daniels & Adrian, LLP

(57) ABSTRACT

A discharge control device controls a discharge bypass circuit for discharging a charge in a capacitor provided in a drive device for a motor that rotates wheels of a vehicle at time of a collision of the vehicle. The discharge control device includes a control circuit that makes the discharge bypass circuit start discharge if an induced voltage by the motor surpasses a predetermined threshold.

3 Claims, 3 Drawing Sheets

(56) References Cited

U.S. PATENT DOCUMENTS

| | | |
|---|---|---|
| 2014/0210260 A1 | 7/2014 | Hirose |
| 2014/0232183 A1* | 8/2014 | Hirose ..................... B60L 7/14 |
| | | 307/10.1 |
| 2015/0034406 A1 | 2/2015 | Hirose |
| 2016/0059702 A1* | 3/2016 | Minesawa ............ B60L 3/0046 |
| | | 307/10.1 |

FOREIGN PATENT DOCUMENTS

| | | |
|---|---|---|
| JP | 2013-188092 A | 9/2013 |
| JP | 2013-198256 A | 9/2013 |

OTHER PUBLICATIONS

Non-final Office Action dated Jun. 29, 2017 issued in co-pending U.S. Appl. No. 14/795,989.
Advisory Action dated Feb. 23, 2018, issued in U.S. Appl. No. 14/795,989. (7 pages).
Final Office Action dated Nov. 2, 2017, issued in U.S. Appl. No. 14/795,989. (12 pages).
Chinese Office Action dated Dec. 5, 2018, issued in counterpart Chinese Patent Application No. 201510319945.4 with English machine translation. (21 pages).

* cited by examiner

F I G . 1
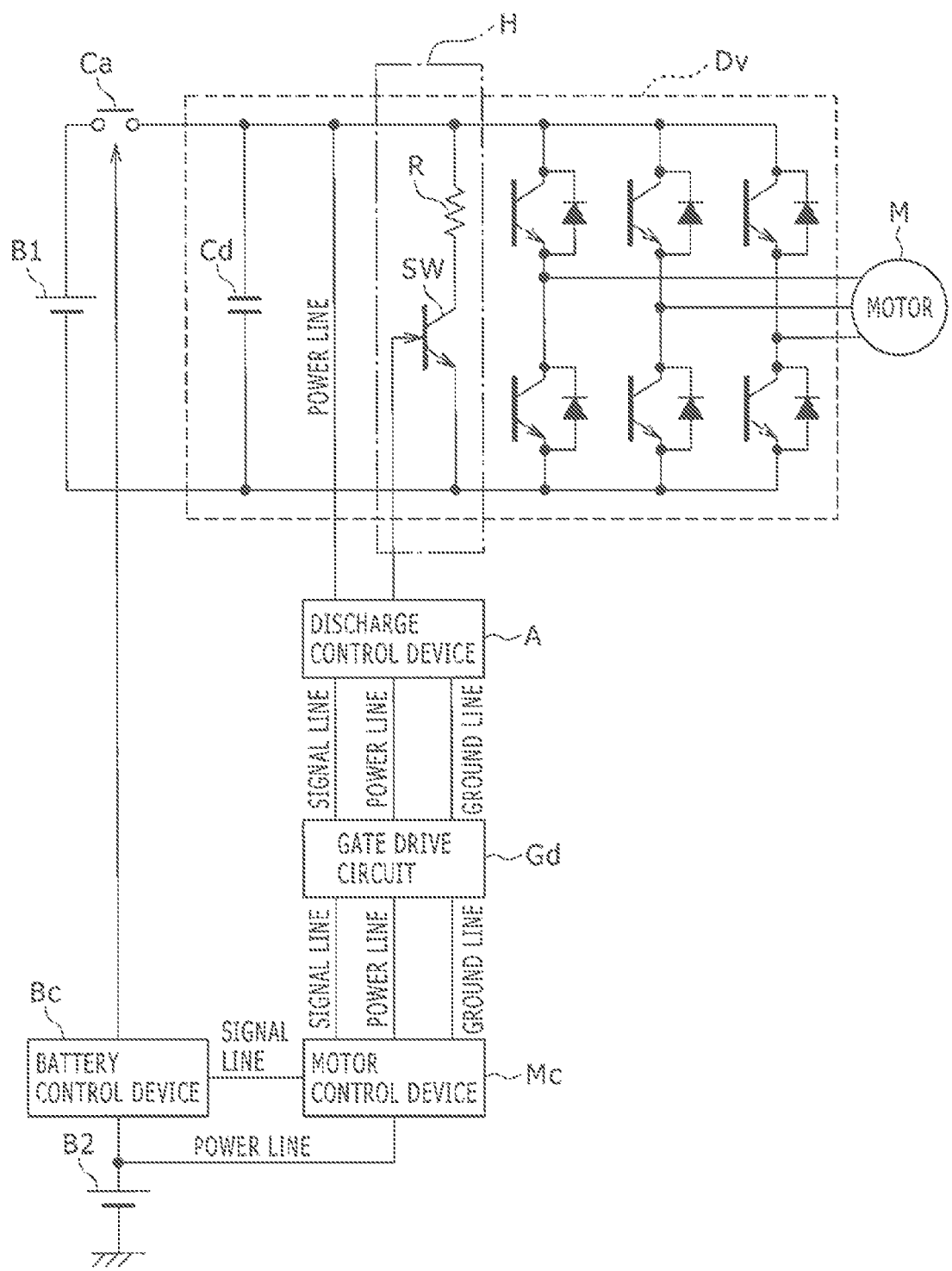

PREVENTING HIGH INDUCED VOLTAGE FROM BEING APPLIED TO DISCHARGE CONTROL DEVICE

CROSS REFERENCE TO RELATED APPLICATION

The present application claims priority under 35 U.S.C. § 119 to Japanese Patent Application No. 2014-174293 filed in the Japan Patent Office on Aug. 28, 2014, the entire content of which is hereby incorporated by reference.

TECHNICAL FIELD

The present invention relates to, for example, a discharge control device.

BACKGROUND

In electric cars and hybrid cars, high-voltage power is stored in a capacitor disposed in a drive circuit to drive a motor at the time of operation and the power stored in the capacitor is discharged safely and rapidly by a rapid discharge circuit if a collision occurs. The rapid discharge circuit is formed of a discharge bypass circuit that is a circuit obtained by connecting a resistor and a switching element in series and is connected in parallel to the capacitor for example. At the time of a collision, the rapid discharge circuit can cause the discharge safely and rapidly by turning the switching element to the on-state to consume the power stored in the capacitor by the resistor. One form of the rapid discharge circuit is disclosed in Japanese patent laid-open publication No. 1996-33103 ("JP '103").

SUMMARY

In the above-described JP '103, among the rapid discharge circuits are one having a form in which a discharge control device for controlling the switching element of the above-described discharge bypass circuit is provided and power to this discharge control device is supplied from the above-described drive circuit. In the case of this form, if wiring of an upper-level control device that controls the discharge control device is disconnected due to shock attributed to a collision, there is a possibility that, when the vehicle is towed after the collision, induced power is generated in the motor attributed to the rotation of wheels and is applied to the discharge control device via the drive circuit and the discharge control device is broken.

One aspect of the present application protects the discharge control device from the induced power generated in the motor due to the rotation of wheels when the vehicle is towed.

According to one embodiment, a discharge control device that controls a discharge bypass circuit for discharging a charge in a capacitor provided in a drive device for a motor that rotates wheels of a vehicle at the time of a collision of the vehicle includes a control circuit that makes the discharge bypass circuit start discharge if an induced voltage by the motor surpasses a predetermined threshold.

According to another embodiment, the control circuit described above has a flip-flop circuit that outputs an output signal that is a discharge instruction to the discharge bypass circuit at the time of the collision of the vehicle and resumes output of the output signal when a reset release signal is input to the flip-flop circuit even if the output of the output signal is stopped, and a reset control circuit that outputs the reset release signal to the flip-flop circuit if the induced voltage by the motor surpasses the predetermined threshold.

According to one embodiment, the discharge control device that controls the discharge bypass circuit for discharging a charge in the capacitor provided in the drive device for the motor that rotates the wheels of the vehicle at the time of a collision of the vehicle includes the control circuit that makes the discharge bypass circuit start discharge if the induced voltage by the motor surpasses the predetermined threshold. This can protect the discharge control device from induced power generated in the motor due to the rotation of the wheels when the vehicle is towed.

BRIEF DESCRIPTION OF THE DRAWINGS

The advantages of this invention will become apparent in the following description taken in conjunction with the drawings, wherein:

FIG. 1 is a functional block diagram including a discharge control device and the periphery thereof;

DETAILED DESCRIPTION

One embodiment of the invention is described with reference to the drawings.

Figure 2:
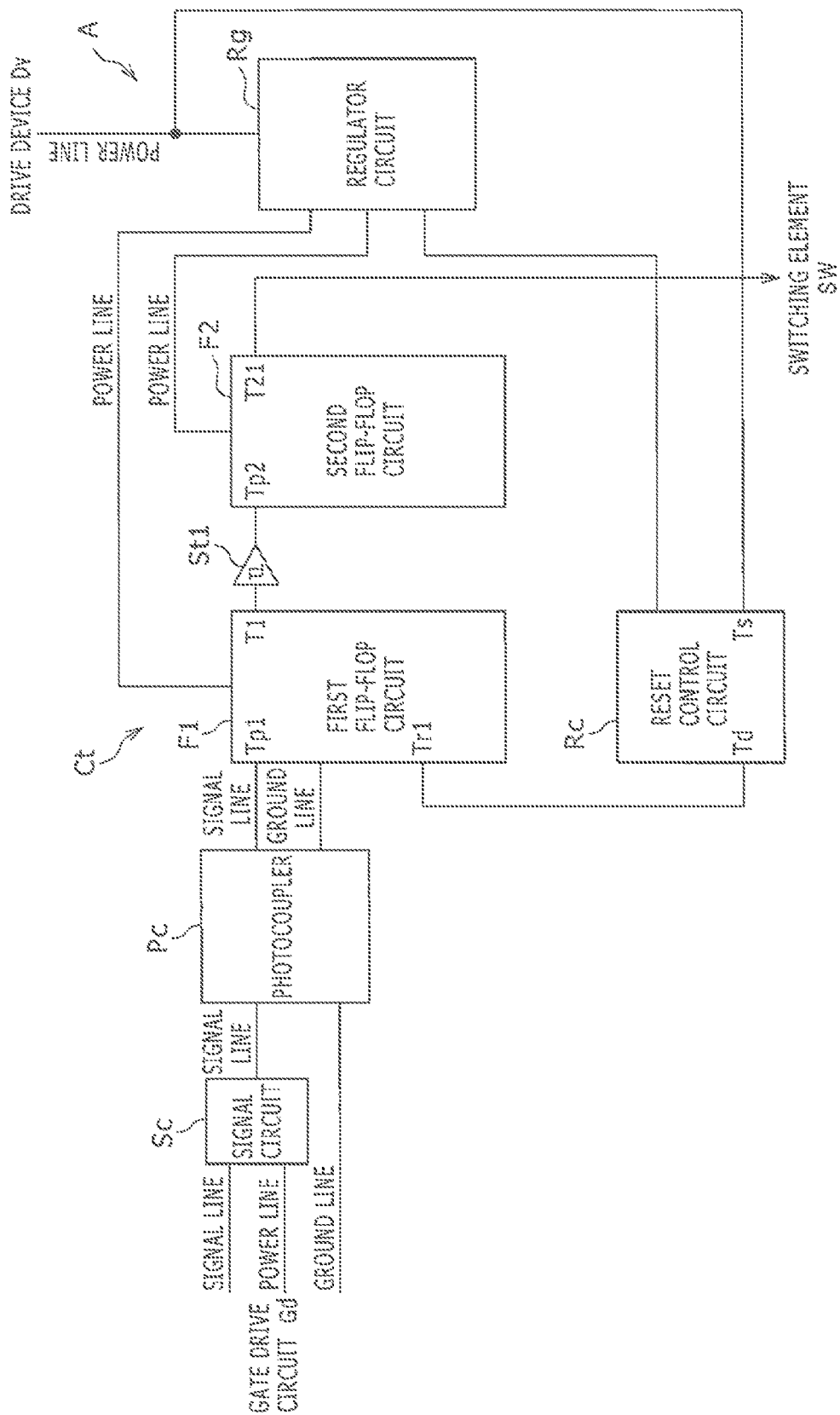
FIG. 2 is a functional block diagram of the discharge control device.

A discharge control device A according to the embodiment is mounted in a moving vehicle such as an electric car (EV: Electric Vehicle) or a hybrid car (HV: Hybrid Vehicle) and controls a discharge bypass circuit H for discharging a charge in a capacitor Cd provided in a drive device Dv for driving a motor M at the time of a collision of the moving vehicle (see FIG. 1). As shown in FIG. 2, the discharge control device A has a regulator circuit Rg, a signal circuit Sc, a photocoupler Pc, and a control circuit Ct.

The regulator circuit Rg drops the voltage of power supplied from a high-voltage battery B1 that supplies power to the drive device Dv for driving the motor M via the capacitor Cd of the drive device Dv, and supplies the resulting power to the control circuit Ct as drive power.

The signal circuit Sc is provided between a gate drive circuit Gd to be described later and the photocoupler Pc. The signal circuit Sc is connected to the gate drive circuit Gd via a signal line and a power line and is connected to the photocoupler Pc via a signal line. For example, when 0 V is input from the gate drive circuit Gd to the signal circuit Sc via the power line or a low voltage is input as a discharge instruction signal from the gate drive circuit Gd to the signal circuit Sc via the signal line, the signal circuit Sc outputs a discharge instruction signal to the photocoupler Pc.

The photocoupler Pc is an insulating element that is provided between the signal circuit Sc and the control circuit Ct and mediates communications between the signal circuit Sc and the control circuit Ct by using an optical signal. The reason why the photocoupler Pc is provided is because the voltage of the drive power of the signal circuit Sc and the gate drive circuit Gd is different from the voltage of the drive power of the control circuit Ct. For example, the control circuit Ct is driven by a higher voltage than the signal circuit Sc and the gate drive circuit Gd.

The control circuit Ct controls the discharge bypass circuit H and has a first flip-flop circuit F1, a first Schmitt trigger St1, a second flip-flop circuit F2, and a reset control circuit Rc.

In the first flip-flop circuit F1, an input terminal Tp1 is connected to the signal circuit Sc via the photocoupler Pc and a Q output terminal T1 is connected to an input terminal Tp2 of the second flip-flop circuit F2 via the first Schmitt trigger St1. Furthermore, a reset terminal Tr1 of the first flip-flop circuit F1 is connected to the reset control circuit Rc.

When the discharge instruction signal is input from the signal circuit Sc to the input terminal Tp1 of the first flip-flop circuit F1 via the photocoupler Pc, the first flip-flop circuit F1 outputs a discharge instruction signal that is a discharge instruction to the discharge bypass circuit H from the Q output terminal T1. The discharge instruction signal output from the first flip-flop circuit F1 is converted to a one-shot pulse by the first Schmitt trigger St1 and is input to the input terminal Tp2 of the second flip-flop circuit F2 as the one-shot pulse.

Furthermore, when a reset signal is input to the reset terminal Tr1 of the first flip-flop circuit F1, the first flip-flop circuit F1 stops the output of the discharge instruction signal from the Q output terminal T1. Moreover, when a reset release signal is input to the reset terminal Tr1, the first flip-flop circuit F1 resumes the output of the discharge instruction signal from the Q output terminal T1.

The input terminal Tp2 of the second flip-flop circuit F2 is connected to the Q output terminal T1 of the first flip-flop circuit F1 via the first Schmitt trigger St1.

When the discharge instruction signal is input from the first Schmitt trigger St1 to the input terminal Tp2 of the second flip-flop circuit F2, the second flip-flop circuit F2 outputs an on-signal from a Q output terminal T21 to a switching element SW of the discharge bypass circuit H. In the discharge bypass circuit H, when the on-signal is input to the switching element SW, the switching element SW becomes the on-state and the discharge state starts.

The first Schmitt trigger St1 is provided between the Q output terminal T1 of the first flip-flop circuit F1 and the input terminal Tp2 of the second flip-flop circuit F2. When the discharge instruction signal is input from the Q output terminal T1 of the first flip-flop circuit F1 to the first Schmitt trigger St1, the first Schmitt trigger St1 outputs the discharge instruction signal that is a one-shot pulse to the input terminal Tp2 of the second flip-flop circuit F2.

In the reset control circuit Rc, a detection terminal Ts is connected to a power line for supplying power from the drive device Dv to the regulator circuit Rg and an output terminal Td is connected to the reset terminal Tr1 of the first flip-flop circuit F1. The reset control circuit Rc detects the voltage of the power that is input to the detection terminal Ts and is supplied from the drive device Dv to the regulator circuit Rg, and outputs the reset release signal from the output terminal Td if this voltage surpasses a predetermined threshold, i.e. if an induced voltage by the motor M surpasses the predetermined threshold.

Furthermore, around the discharge control device A, a motor control device Mc, a contactor Ca, a battery control device Bc, and a low-voltage battery B2 are provided in addition to the above-described discharge bypass circuit H, motor M, drive device Dv, high-voltage battery B1, and gate drive circuit Gd (see FIG. 1).

The discharge bypass circuit H is a circuit obtained by connecting a resistor R and the switching element SW in series and is connected in parallel to the capacitor Cd of the drive device Dv. In this discharge bypass circuit H, at the time of a collision of the moving vehicle, an on-signal is input from the second flip-flop circuit F2 to the switching element SW and thereby the switching element SW becomes the on-state and the charge in the capacitor Cd provided in the drive device Dv is discharged by the resistor R.

The motor M is e.g. a three-phase motor formed of U-phase, V-phase, and W-phase. The rotating shaft thereof is connected to wheels of the moving vehicle and the motor M rotates the wheels.

The drive device Dv is formed of an inverter circuit and so forth and converts DC power supplied from the high-voltage battery B1 to three-phase drive power formed of the U-phase, V-phase, and W-phase by the inverter circuit to supply the drive power to the motor M. For example, the drive device Dv has the capacitor Cd that is a smoothing capacitor at the previous stage of the inverter circuit.

The high-voltage battery B1 supplies power to the motor M and the discharge control device A via the drive device Dv and its voltage is set to a higher voltage than the low-voltage battery B2.

The gate drive circuit Gd is provided between the motor control device Mc and the discharge control device A and outputs a discharge instruction signal to the signal circuit Sc on the basis of a discharge instruction signal input from the motor control device Mc.

The motor control device Mc is composed of a CPU (Central Processing Unit), a ROM (Read Only Memory), a RAM (Random Access Memory), and so forth. The motor control device Mc executes various kinds of operation processing on the basis of various kinds of operation control programs stored in the ROM and controls the drive device Dv, the gate drive circuit Gd, and so forth on the basis of operation processing results.

The contactor Ca is a switching element that is provided between one terminal of the capacitor Cd of the drive device Dv and one terminal of the high-voltage battery B1 and becomes the on-state or off-state on the basis of a control signal input from the battery control device Bc. For example, the control signal is input from the battery control device Bc to the contactor Ca and the contactor Ca is switched from the on-state to the off-state immediately before the switching element SW of the discharge bypass circuit H becomes the on-state.

The battery control device Bc is composed of a CPU (Central Processing Unit), a ROM (Read Only Memory), a RAM (Random Access Memory), and so forth. The battery control device Bc executes various kinds of operation processing on the basis of various kinds of operation control programs stored in the ROM and controls the contactor Ca and so forth on the basis of operation processing results.

The low-voltage battery B2 supplies power to the motor control device Mc and the battery control device Bc and its voltage is set to a lower voltage than the high-voltage battery B1.

Next, the operation of the discharge control device A configured in this manner will be described.

The discharge control device A is to control the discharge bypass circuit H for discharging a charge in the capacitor Cd provided in the drive device Dv for driving the motor M at the time of a collision of the moving vehicle, and executes the following characteristic processing.

In the discharge control device A, the control circuit Ct makes the discharge bypass circuit H perform discharge once at the time of a collision of the moving vehicle. Specifically, when a discharge instruction signal is input from the signal circuit Sc to the input terminal Tp1 of the first flip-flop circuit F1 via the photocoupler Pc, the first flip-flop circuit F1 outputs a discharge instruction signal that is a discharge instruction to the discharge bypass circuit H from the Q output terminal T1. Subsequently, when the discharge instruction signal is input from the Q output terminal T1 of the first flip-flop circuit F1 to the first Schmitt trigger St1, the first Schmitt trigger St1 outputs a discharge instruction signal that is a one-shot pulse to the input terminal Tp2 of the second flip-flop circuit F2.

Then, when the discharge instruction signal is input from the first Schmitt trigger St1 to the input terminal Tp2, the second flip-flop circuit F2 outputs an on-signal from the Q output terminal T21 to the switching element SW of the discharge bypass circuit H. Thereafter, when a reset signal is input to the reset terminal Tr1, the first flip-flop circuit F1 stops the output of the discharge instruction signal from the Q output terminal T1. As a result, the second flip-flop circuit F2 stops the output of the on-signal from the Q output terminal T21 to the switching element SW of the discharge bypass circuit H.

Figure 3:
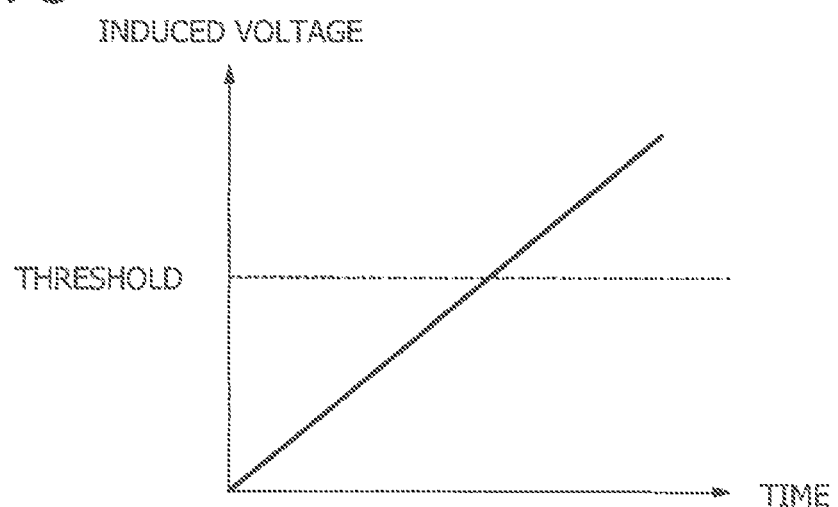
FIG. 3 is a diagram showing an induced voltage of a motor of the discharge control device.

In the discharge control device A, the control circuit Ct makes the discharge bypass circuit H start discharge if the moving vehicle is towed and an induced voltage by the motor M surpasses a predetermined threshold after the collision of the moving vehicle. Specifically, first, the reset control circuit Rc detects the voltage of the power that is input to the detection terminal Ts and is supplied from the drive device Dv to the regulator circuit Rg, and outputs a reset release signal from the output terminal Td if this voltage surpasses the predetermined threshold, i.e. if the induced voltage by the motor M surpasses the predetermined threshold (see FIG. 3). As a result, the first flip-flop circuit F1 outputs the discharge instruction signal from the Q output terminal T1 again. Accordingly, if the moving vehicle is towed and the induced voltage by the motor M surpasses the predetermined threshold after the collision of the moving vehicle, the control circuit Ct makes the discharge bypass circuit H start discharge.

According to such an embodiment, the discharge control device A that controls the discharge bypass circuit H for discharging a charge in the capacitor Cd provided in the drive device Dv for the motor M that rotates wheels of the moving vehicle at the time of a collision of the moving vehicle includes the control circuit Ct that makes the discharge bypass circuit H start discharge if the induced voltage by the motor M surpasses the predetermined threshold. This can protect the discharge control device A from induced power generated in the motor M due to the rotation of the wheels when the moving vehicle is towed.

Although the embodiment of the present invention is described above, the present invention is not limited to such an embodiment and e.g. the following modification will be possible.

The embodiment may be mounted in a device other than the moving vehicle.

It should be understood by those skilled in the art that various modifications, combinations, sub-combinations and alterations may occur depending on design requirements and other factors insofar as they are within the scope of the appended claims or the equivalents thereof.

I claim:

1. A discharge control device that controls a discharge bypass circuit for discharging, at time of a collision of a vehicle, a charge in a capacitor provided in a drive device for a motor that rotates wheels of the vehicle, the drive device supplying a power received from a battery to the motor to drive the motor, the drive device supplying the power to the discharge control device, the discharge control device comprising
a control circuit that makes the discharge bypass circuit start discharge at the time of the collision of the vehicle by receiving a discharge instruction signal, and after discharge of the charge in the capacitor, makes the discharge bypass circuit start discharge when an induced voltage induced by the motor surpasses a predetermined threshold,
wherein the drive device is electrically connected to the motor and the discharge control device such that the induced voltage induced by the motor is applied to the discharge control device via the drive device,
wherein the control circuit includes:
(i) a flip-flop circuit that:
outputs an output signal that is a discharge instruction to the discharge bypass circuit at the time of the collision of the vehicle by receiving the discharge instruction signal to an input terminal of the flip-flop circuit,
stops, after discharge of the charge in the capacitor, the output of the output signal upon receiving a reset signal, and
resumes output of the output signal when a reset release signal is input to the flip-flop circuit, and
(ii) a reset control circuit that outputs the reset release signal to the flip-flop circuit when the induced voltage induced by the motor surpasses the predetermined threshold,
wherein the drive device is connected to the discharge control device via a power line such that the drive device supplies power to the discharge control device via the power line,
wherein the reset control circuit is connected to the power line, the reset control circuit determines whether the induced voltage induced in the power line surpasses the predetermined threshold,
wherein the flip-flop circuit and the reset control circuit are supplied with power through the power line.

2. The discharge control device according to claim 1, wherein the discharge bypass circuit discharges the induced voltage.

3. A vehicle comprising the discharge control device according to claim 1.

* * * * *